United States Patent
Bioret

(10) Patent No.: US 12,219,920 B2
(45) Date of Patent: Feb. 11, 2025

(54) ELASTIC LAYER FOR A MATTRESS STRUCTURE DESIGNED FOR THE COMFORT OF ANIMALS IN A BREEDING ENCLOSURE

(71) Applicant: GROUP ELASTOTECK, Nort sur Erdre (FR)

(72) Inventor: Jean-Vincent Bioret, Petit Mars (FR)

(73) Assignee: GROUP ELASTOTECK, Nort sur Erdre (FR)

( * ) Notice: Subject to any disclaimer, the term of this patent is extended or adjusted under 35 U.S.C. 154(b) by 476 days.

(21) Appl. No.: 17/431,601

(22) PCT Filed: Feb. 19, 2020

(86) PCT No.: PCT/FR2020/050315
§ 371 (c)(1),
(2) Date: Aug. 17, 2021

(87) PCT Pub. No.: WO2020/169930
PCT Pub. Date: Aug. 27, 2020

(65) Prior Publication Data
US 2022/0071168 A1 Mar. 10, 2022

(30) Foreign Application Priority Data
Feb. 20, 2019 (FR) ...................................... 1901710

(51) Int. Cl.
*A01K 1/015* (2006.01)
*A47C 27/00* (2006.01)
(Continued)

(52) U.S. Cl.
CPC ............ *A01K 1/015* (2013.01); *A47C 27/003* (2013.01); *A47C 27/15* (2013.01); *A47G 9/062* (2013.01)

(58) Field of Classification Search
CPC ..... A47C 27/003; A47C 27/15; A47C 27/001; A47C 27/148; A01K 1/015; A01K 1/0157;
(Continued)

(56) References Cited

U.S. PATENT DOCUMENTS

| | | | |
|---|---|---|---|
| 4,590,714 A * | 5/1986 | Walker | .................... B32B 27/26 |
| | | | 5/417 |
| 6,935,273 B2 * | 8/2005 | Throndsen | ........... A01K 1/0157 |
| | | | 119/431 |

(Continued)

FOREIGN PATENT DOCUMENTS

| | | |
|---|---|---|
| EP | 3 011 829 | 4/2016 |
| IE | S990443 | 5/2000 |
| WO | 9917604 | 4/1999 |

OTHER PUBLICATIONS

International Search Report for PCT/FR2020/050315, mailed Jun. 9, 2020, 6 pages.
(Continued)

*Primary Examiner* — Robert G Santos
(74) *Attorney, Agent, or Firm* — NIXON & VANDERHYE

(57) ABSTRACT

Disclosed is an elastic layer for a mattress structure designed for the comfort of animals in a breeding enclosure, the mattress structure being intended to cover the ground of a receiving area. This elastic layer includes a top face capable of undergoing elastic deformation and that includes a location on which an animal is intended to be supported. The elastic layer is delimited by borders, at least one border being a fastening band intended to receive a structure securing the receiving area with the ground. The fastening band is formed by a lip, the thickness of which is less than the thickness of the elastic layer. Such a structure of the fastening band allows the securing component to be installed
(Continued)

at the lip. The securing component can then be protected and covered by the lip, so as to prevent direct contact with the animals.

14 Claims, 3 Drawing Sheets

(51) Int. Cl.
*A47C 27/15* (2006.01)
*A47G 9/06* (2006.01)

(58) Field of Classification Search
CPC ...... A47G 9/062; A47G 9/06; A47G 27/0212; A47G 27/0237
USPC ................... 5/417, 420, 722, 723, 727, 728
See application file for complete search history.

(56) References Cited

U.S. PATENT DOCUMENTS

| | | | |
|---|---|---|---|
| 12,075,753 B2* | 9/2024 | Throndsen | A01K 1/0157 |
| 2022/0071168 A1* | 3/2022 | Bioret | A01K 1/0157 |
| 2023/0389513 A1* | 12/2023 | Throndsen | A01K 1/0353 |

OTHER PUBLICATIONS

Written Opinion of the ISA for PCT/FR2020/050315, mailed Jun. 9, 2020, 7 pages.

* cited by examiner

ELASTIC LAYER FOR A MATTRESS STRUCTURE DESIGNED FOR THE COMFORT OF ANIMALS IN A BREEDING ENCLOSURE

This application is the U.S. national phase of International Application No. PCT/FR2020/050315 filed 19 Feb. 2020, which designated the U.S. and claims priority to FR Patent Application No. 1901710 filed 20 Feb. 2019, the entire contents of each of which are hereby incorporated by reference.

BACKGROUND OF THE INVENTION

Field of the Invention

The present invention relates to the technical field of mattress structures that are adapted for the comfort of animals in a livestock enclosure.

It more particularly relates to an elastic layer that is adapted for the manufacturing of such mattress structures.

Description of the Related Art

The animal comfort is a determining parameter in the breeding efficiency.

This comfort influences in particular the health of the animals, the way they eat, the quantity of food they ingest as well as their fertility and longevity.

For that purpose, commonly, when in stable, the cattle have a rest individually in stalls, also commonly called "free stalls", in which they are free to stand up or lie down.

When carrying out these movements, the animals are liable to injure themselves. This is in particular the case when the bedding is consisted of concrete covered with straw, which does not protect the animal against slide risks.

To limit this type of incident and the injuries that ensue therefrom, it is known to equip the ground of these stalls with mattresses adapted to improve the animal bedding comfort.

These comfort mattresses conventionally comprise for that purpose at least one elastic layer that is able to undergo an elastic deformation.

To stay in place, these elastic layers must be fastened to the ground, usually by means of a set of suitably distributed metal parts (for example, nails or screws).

But in practice, these metal parts are often prominent with respect to the elastic layer and they can then be the cause of injury (cuts, rubs, etc.) for the animals.

There hence exists a need for a solution that would allow the fastening of said elastic layer to the ground, while preventing the risk of injury with its fastening means.

SUMMARY OF THE INVENTION

In order to remedy the above-mentioned drawback of the state of the art, the present invention proposes an elastic layer for a mattress structure adapted for the comfort of animals in a livestock enclosure, said mattress structure being intended to cover the ground of an accommodation area.

According to the invention, said elastic layer includes two opposite faces: an upper face that is able to undergo an elastic deformation and that includes at least one location suitable for an animal to rest on, and a lower face; the upper and lower faces define the thickness of said elastic layer.

The elastic layer is delimited by borders, at least one of said borders being formed by a one-piece fastening strip intended to receive means for its securing to the ground of said accommodation area.

And said at least one fastening strip is formed by at least one lip, said at least one lip including a lower face, an upper face and a free peripheral edge.

The upper and lower faces define the thickness of said at least one lip.

And the thickness of said at least one lip is lower than the thickness of said elastic layer.

Such a structure of the fastening strip allows an implantation of securing means (possibly in the form of metal parts) at said above-mentioned at least one lip.

These securing means can then be protected and covered by said at least one lip, in such a way as to prevent a direct contact with the animals.

The animals can then settle down on the comfort mattress, without risking injuring themself with the securing means.

Other non-limitative and advantageous features of the product according to the invention, taken individually or according to all the technically possible combinations, are the following:

for an accommodation area bordered by a circulation corridor, said elastic layer includes the following borders: a rear longitudinal border, intended to be located along said circulation corridor, a front longitudinal border, intended to be located remote from said circulation corridor, and two lateral borders; and at least said rear longitudinal border is formed by said fastening strip;

said at least one lip includes at least one reinforcement sub-layer;

said at least one fastening strip is formed by two superposed lips: an upper lip and a lower lip, said lips each having a lower face, an upper face and a free peripheral edge; preferably, the lips have identical widths, or the width of the upper lip is greater than the width of the lower lip;

said at least one fastening strip is formed by a single lip, whose upper face advantageously extends in continuation of the upper face of said elastic layer;

said at least one lip has a width from 30 to 100 mm, preferably from 50 to 60 mm;

said at least one location is located above a continuous thickness of elastomeric material, or at least two sub-layers of elastomeric material forming a sealed chamber intended to be filled with a fluid.

The present invention also relates to a method for manufacturing an elastic layer according to the invention.

This manufacturing method comprises:

(i) a step of superposing sub-layers of elastomeric material including two opposite surfaces, between which are placed interlayer means for locally preventing the securing of said opposite surfaces of said sub-layers to each other, in order to form at least two superposed lips and, as the case may be, said at least one sealed chamber, then (ii) a step of securing to each other the surfaces in contact of said superposed sub-layers, out of the space occupied by the interlayer means, in such a way that the interlayer means form said lips and, as the case may be, said at least one sealed chamber, then (iii) a potential step of cutting one at least of said lips, to reduce at least a part of the width of said at least one lip.

The invention also relates to the mattress structure adapted for the comfort of animals in a livestock enclosure, intended to cover the ground of an accommodation area, said mattress structure including, or consisting of, at least one elastic layer according to the invention.

The present invention also relates to the method for installing a mattress structure according to the invention.

This method comprises a step of securing the fastening strip to the ground of the accommodation area by placing securing means at said at least one lip.

Preferably:
- in the case of lips having identical widths, the securing means are placed on the lower lip and are covered by the upper lip, or
- in the case of a width of the upper lip that is greater than the width of the lower lip or in the case of a fastening strip formed by a single upper lip, the securing means are placed within the upper lip, directed towards the ground, then the elastic layer is handled in such a way as to bend/fold said upper lip to form a hem.

The invention also relates to the livestock enclosure within which is arranged at least one accommodation area for the animals, whose ground is covered with a mattress structure according to the invention. And said at least one lip of the elastic layer is secured to the ground using added securing means.

Of course, the different features, alternatives and embodiments of the invention can be associated with each other according to various combinations, insofar as they are not incompatible with each other or exclusive from each other.

BRIEF DESCRIPTION OF THE DRAWINGS

Moreover, various other features of the invention will be apparent from the appended description made with reference to the drawings that illustrate non-limitative embodiments of the invention, and wherein.

DESCRIPTION OF THE PREFERRED EMBODIMENTS

It is to be noted that, in these figures, the structural and/or functional elements common to the different variants can have the same references.

Figure 1:
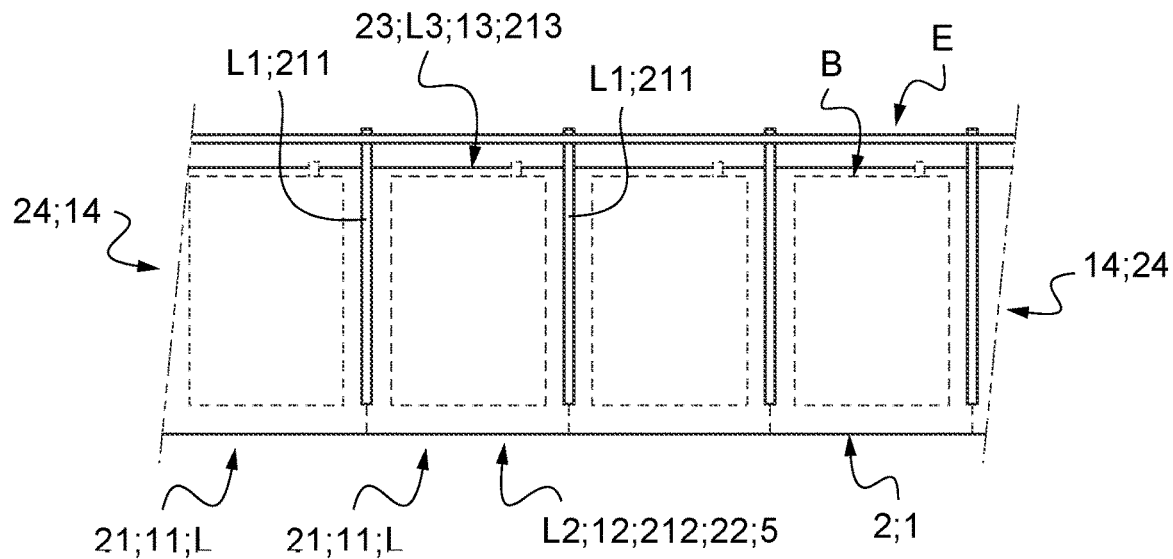
FIG. 1 is a schematic top view showing a series of stalls equipped with a mattress structure including an elastic layer according to the invention.

The elastic layer 1 according to the invention is intended to form all or part of a mattress structure 2 adapted for the comfort of animals in a livestock enclosure E in which bedding boxes are advantageously arranged (FIG. 1).

The livestock enclosure E advantageously consists of a stable for breeding cattle, in particular dairy cattle or beef cattle.

The bedding boxes herein consist of stalls L, arranged into at least one row, forming an accommodation area for the animals.

The stalls L constitute a compromise between a comfortable bedding for the cattle, the respect of the stand-up/lie-down movement, a comfortable upright posture and a minimum stain in the stall.

According to FIG. 1, each stall L, conventional per se, is delimited by:
- two lateral partitions L1, for example tubular structures,
- a stall rear sill L2, extending along an access corridor,
- a front limit L3, advantageously comprising an upper bar at the withers and a lower stop (or advance limiter), forming the back of the stall L, and
- a ground L4, for example a concrete slab.

Comfort Mattress

The mattress structure 2 is also called "comfort mattress".

The mattress structure 2 (and its elastic layer 1) is herein continuous, in such a way as to cover the ground L4 of the aligned stalls L.

The mattress structure 2 hence includes several locations 21 that are juxtaposed in the longitudinal direction, according to a parallel arrangement (FIG. 1).

As an alternative, not shown, each stall L can contain its own comfort mattress 2 (and its elastic layer 1) that then defines a single location 21.

The comfort mattress 2 has a generally rectangular shape that is delimited by two couples of edges, i.e.:
- two longitudinal edges, i.e. a rear longitudinal edge 22 intended to extend along the rear sill L2 of the equipped stalls L, and a front longitudinal edge 23 intended to extend along the front limit L3 of the row of stalls L, and
- two transverse edges 24, intended to be located at lateral partitions L1 between two stalls L at the end of a row (not shown).

The comfort mattress 2 also includes two opposites faces:
- an upper face 25, able to undergo an elastic deformation and forming the locations 21 on which the animals are intended to rest, and
- a lower face 26, intended to bear on the ground L4 of the stalls L.

Each of the locations 21 of the comfort mat 2 is herein intended to receive an animal.

Each locations 21 hence corresponds to the ground surface L4 of a stall L, and is laterally delimited by two lateral partitions L1.

Each of the locations 71 has then a generally rectangular shape that is delimited by different borders (FIG. 1):
- two lateral borders 211, each located in alignment with a lateral partition L1 of the stall L.
- a rear edge 212, adjacent to the rear sill L2 of the stall L (forming a portion of the rear longitudinal edge 22 of the comfort mattress 2), and
- a front border 213, adjacent to the front limit L3 of the stall L (forming a portion of the front longitudinal edge 23 of the comfort mattress 2).

Elastic Layer of the Comfort Mattress

Figure 3:
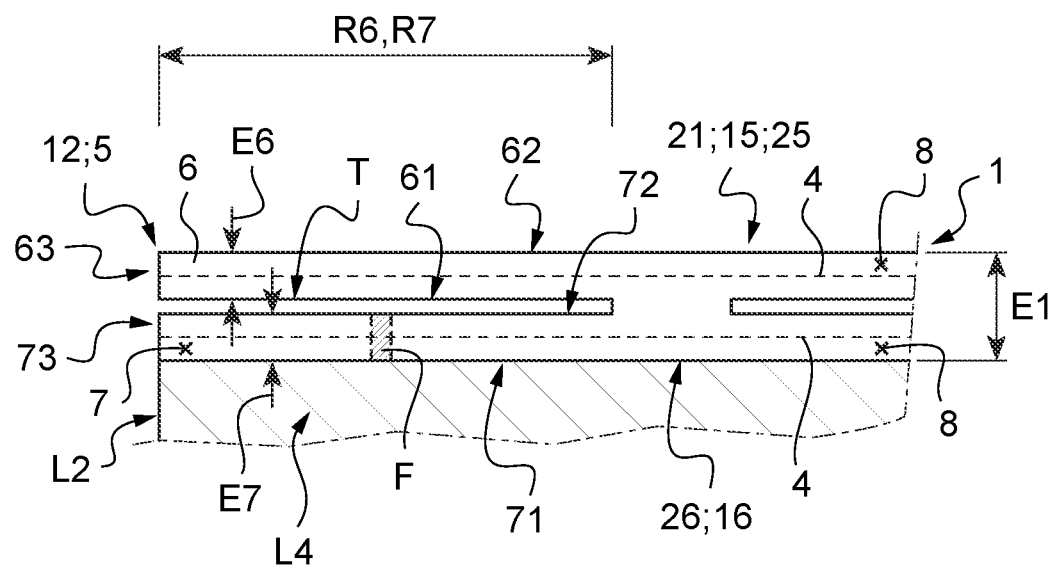
FIG. 3 is a cross-sectional and partial view of a first embodiment for the elastic layer according to FIG. 2, whose fastening strip lips have identical widths.

According to the invention, the elastic layer 1 can form:
- a part of the comfort mattress 2 (in particular a part of its thickness), covering for example a comfort sub-layer 28 (FIG. 7), or integrally the comfort mattress (FIG. 3).

In particular, this elastic layer 1 advantageously has a generally rectangular shape that is delimited by two couples for borders:
- two longitudinal borders, a rear one 12 and a front one 13, forming the rear longitudinal edge 22 and front longitudinal edge 23, respectively, of the comfort mattress 2, and
- two transverse borders 14, forming the respective transverse edges 24 of the comfort mattress 2.

In particular, the rear longitudinal border 12 is intended to be located along the circulation corridor; and the front longitudinal edge 13 is intended to be located remote from this same circulation corridor.

The elastic layer 1 also has two opposite faces:
- an upper face 15, intended to form the upper face 25 of the comfort mattress 2, and
- a lower face 16, intended to be directed towards the ground $\underline{L4}$ and potentially forming the lower face 26 of the comfort mattress 2 (in particular in the case of an elastic layer 1 forming integrally the comfort mattress 2).

These upper and lower faces 15, 16 define the thickness $\vec{\underline{E1}}$ of the elastic layer 1.

The upper face 15 of the elastic layer 1 is hence able to undergo an elastic deformation. It includes at least one location 11, corresponding to the above-mentioned locations 21 of the comfort mattress 2, on which an animal is intended to rest.

This upper face 15 also advantageously includes an anti-skid relief, to reduce the risk of animal slides.

This elastic layer 1 is made from at least one material able to undergo an elastic deformation, also called "elastic material", advantageously chosen among:
- the elastomeric materials, i.e. for example the natural rubber, the "synthetic natural" rubber (or synthetic poly-isoprene), the polybutadiene or the styrene-budatiene, or
- the plastic or thermoplastic elastomeric (TPE) materials, i.e. for example PVB (polyvinyl butyral), ABS (acrylonitrile butadiene styrene)/SBR (styrene-butadiene), PP (polypropylene)/EPDM (ethylene-propylene-diene monomer), TPU (TPE polyurethane).

This elastic layer 1 is advantageously one-piece made, either single-material (made of only one material), or multi-material (with at least two superposed sub-layers made in different materials).

The elastic layer 1 can also contain reinforcement sub-layers 4, the arrangement of which is described hereinafter in relation with FIG. 3 and following.

These reinforcement sub-layers 4 are advantageously chosen among textile fibres, metal fibres, or any other product providing stability and/or resistance to elongation.

These reinforcement sub-layers 4 consists for example of a textile insert serving as a reinforcement, advantageously made of a material chosen among nylon, cotton, polyester, polyamide or any other reinforcement textile.

According to the invention, one at least of the borders 12, 13, 14 of this elastic layer 1 consists of a one-piece fastening strip 5 intended to receive means $\underline{F}$ for the securing to the ground $\underline{L4}$ of the accommodation area $\underline{L}$.

Herein, the rear longitudinal border 12 of this elastic layer 1 forms this fastening strip 5.

Figure 5:
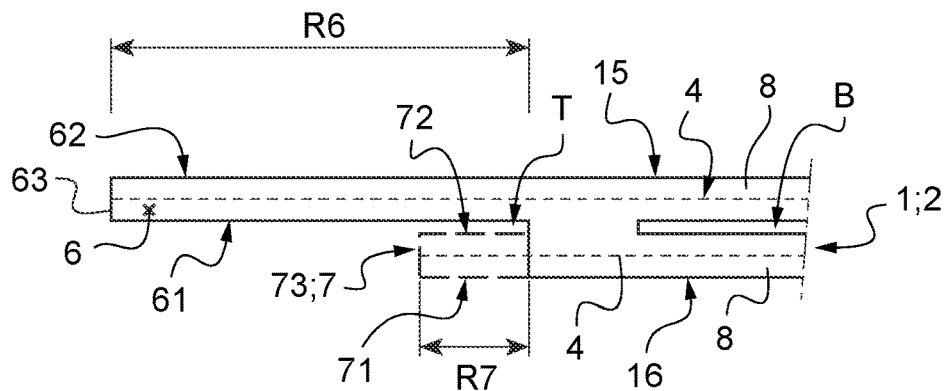
FIG. 5 is a cross-sectional and partial view of a second embodiment for the elastic layer of FIG. 2, whose fastening strip lips have different widths.

This fastening strip 5 is formed by at least one lip 6, 7 (FIGS. 3 and 5).

Said at least one lip 6, 7 includes a lower face 61, 71, an upper face 62, 72 and a free peripheral edge 63, 73.

The upper and lower faces 62, 61; 72, 71 of a lip 6, 7 advantageously extend parallel to each other.

The upper and lower faces 62, 61; 72, 71 of a lip 6, 7 define the thickness $\underline{E6}$, $\underline{E7}$ of this lip 6, 7.

Still according to the invention, the thickness $\underline{E6}$, $\underline{E7}$ of said at least one lip 6, 7 is lower than the thickness $\underline{E1}$ of the elastic layer 1.

In other words, the thickness $\underline{E6}$ of a single lip 6 or, as the case may be, the thickness $\underline{E6}$, $\underline{E7}$ of each lip 6, 7 is lower than the thickness $\underline{E1}$ of the elastic layer 1.

For example, said at least one lip 6, 7 advantageously has a thickness $\underline{E6}$, $\underline{E7}$ corresponding to half the thickness $\underline{E1}$ of the elastic layer 1.

In the case of a fastening strip 5 including two lips 6, 7, the thickness $\underline{E7}$ of the lower lip 7 can also be lower than the thickness $\underline{E6}$ of the upper lip 6.

Generally, said at least one lip 6, 7 advantageously has a height (also called thickness) $\underline{E6}$, $\underline{E7}$ from 2 to 5 mm; the heigh $\underline{E1}$ (also called thickness) of the elastic layer 1 is between 5 and 10 mm.

Figure 7:
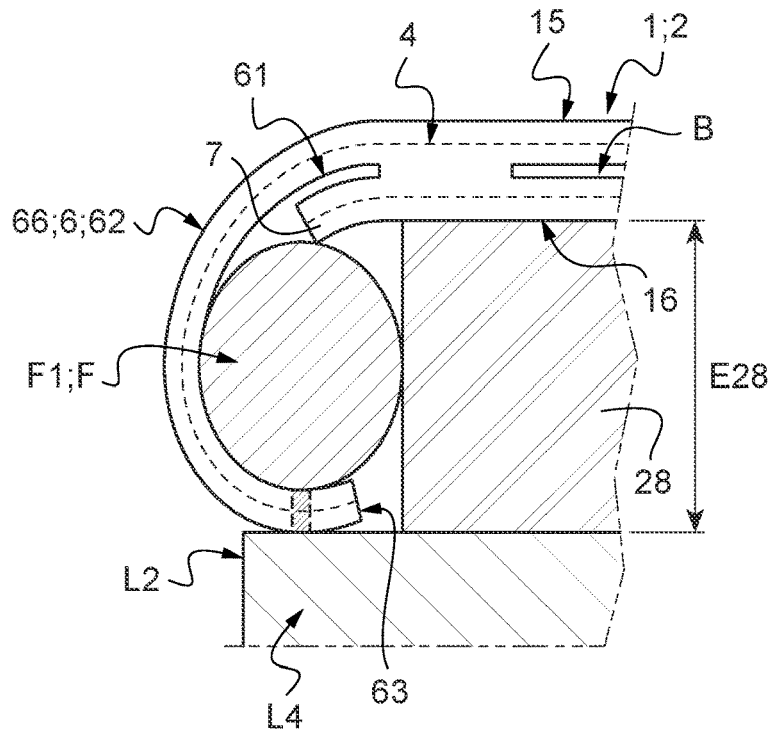
FIG. 7 shows a second step of the method for installing a mattress structure according to FIG. 5.

Two embodiments of the fastening strip 5 are illustrated in FIG. 3 and following:
- the fastening strip 5 is formed by two superposed lips, with an upper lip 6 and a lower lip 7 (in particular, FIGS. 3 and 5), and
- the fastening strip 5 is formed by a single lip 6 (advantageously, according to FIG. 7, only the upper lip 6 and not the lower lip 7, which is shown in dashed line).

In a first embodiment, the fastening strip 5 hence advantageously has two superposed lips (FIGS. 3 and 5):
- an upper lip 6, located in the continuation of the upper face 15 of the elastic layer 1, and
- a lower lip 7, located in the continuation of the lower face 16 of the elastic layer 1.

These lips 6, 7 each include a lower face (on the side of the lower face 16 of the elastic layer 1), an upper face (on the side of the upper face 15 of the elastic layer 1) and a free peripheral edge.

In particular, the upper lip 6 has:
- a lower face 61, opposite the lower lip 7,
- an upper face 62, in the continuation of the upper face 15 of the elastic layer 1, and
- a free peripheral edge 63.

The lower lip 7 also includes:
- a lower face 71, in the continuation of the lower face 16 of the elastic layer 1,
- an upper face 72, opposite the upper lip 6, and
- a free peripheral edge 73.

The lower face 61 of the upper lip 6 and the upper face 72 of the lower lip 7 are hence, on the one hand, opposite to each other, and on the other hand, independent/dissociated from each other.

These two lips 6, 7 hence delimit a kind of slot $\underline{T}$, extending in a part of the thickness of this elastic layer 1 (between the two opposite faces 15, 16 of the elastic layer 1).

This slot $\underline{T}$ is moreover a through-slot, herein along the rear longitudinal border 12 of the elastic layer 1, and advantageously along a part of the length of the transverse borders 14 of this same elastic layer 1.

The lips 6, 7 are in particular defined by a width dimension, $\underline{R6}$ and $\underline{R7}$, respectively (shown in FIGS. 3 and 5).

This width dimension $\underline{R6}$, $\underline{R7}$ of a lip 6, 7 corresponds to the dimension measured between its free peripheral edge 63, 73 and the bottom of the slot $\underline{I}$.

In practice, the lips 6, 7 can have the following width dimensions R6, R7:
- the lips 6, 7 have identical widths (FIG. 3), or
- the width R6 of the upper lip 6 is greater than the width R7 of the lower lip 7 (FIG. 5).

For identical widths, the lips 6, 7 advantageously have a width R6, R7 from 30 to 100 mm, preferably from 50 to 70 mm.

For different widths, the upper lip 6 has for example a width R6 from 30 to 100 mm, preferably from 50 to 70 mm. And the lower lip 7 has for example a width R7 from 5 to 10 mm.

In the second embodiment, the fastening strip 5 is hence formed by a single lip 6 (FIG. 5).

In other words, the fastening strip 5 advantageously includes only the upper lip 6, and is devoid of the lower lip 7.

In particular, the upper lip 6 hence includes:
- a lower face 61, extending into the thickness E1 of the elastic layer 1 and remote from the lower face 16 of the elastic layer 1, and
- an upper face 62, in the continuation of the upper face 15 of the elastic layer 1.

The upper lip 6 has for example a width R6 from 30 to 100 mm, preferably from 50 to 70 mm.

Generally, said at least one lip 6, 7 also advantageously includes at least one reinforcement sub-layer 4.

This reinforcement sub-layer 4 is interesting to provide an optimal mechanical strength at the installation of the securing means F.

Moreover and generally, said at least one location 11, 21 is for example located above:
- a continuous thickness of elastomeric material (not shown), or
- at least two sub-layers 8 of elastomeric materials, forming together a sealed chamber B intended to be filled with a fluid (FIGS. 3 and 5).

Hence, in the embodiment according to FIGS. 3 and 5, the elastic layer 1 herein includes, in its thickness and within its constituent material, sealed chambers B. The elastic layer 1, and in particular the constituent material thereof, hence directly defines the sealed chambers B.

The sealed chambers B are juxtaposed and are each located under a location 11 of the elastic layer 1. In other words, the locations 11 of the elastic layer 1 are each located above a sealed chamber B that is present.

Preferably, each location 11 then includes one of these sealed chambers B, that is proper to it.

Figure 2:
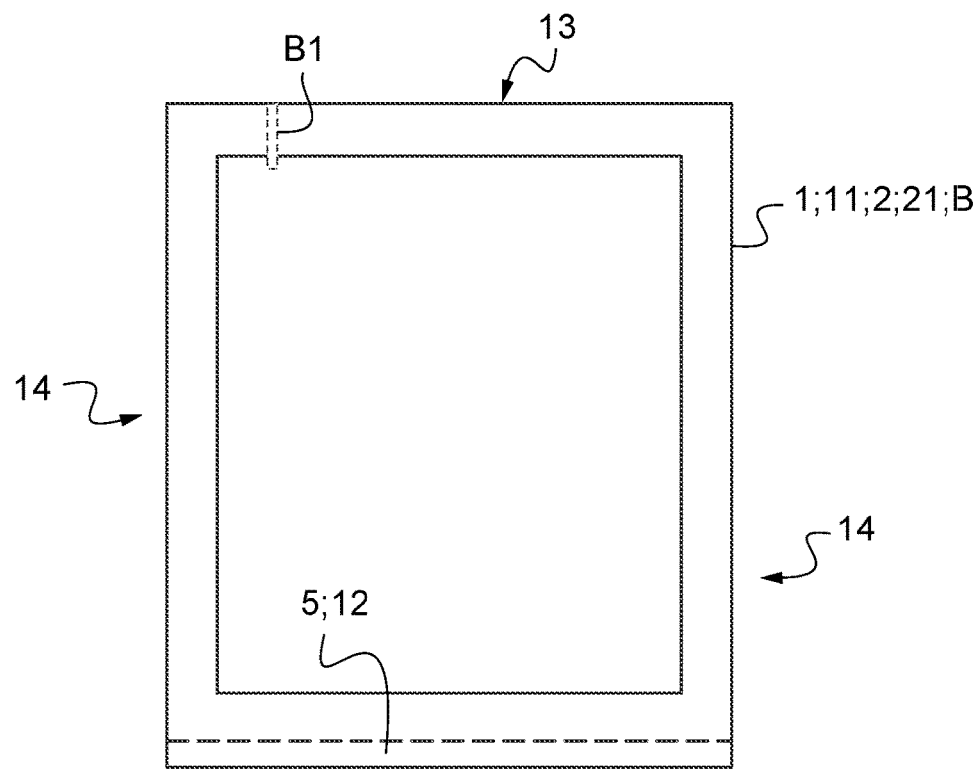
FIG. 2 is a top and partial view of the elastic layer that includes a rear longitudinal border forming a fastening strip intended to receive the means for the securing to the ground, and whose location is located above a sealed chamber intended to be filled with a fluid.

Each sealed chamber B has, viewed from above, a rectangular contour corresponding at least approximately to the surface area of a stall L (FIGS. 1 and 2).

The fluid intended to fill each sealed chamber B is advantageously chosen among water, a gas (in particular, air), a gel.

Each sealed chamber B is for that purpose associated with a through-orifice B1 for the access thereto, in particular for the filling and/or emptying thereof, for example an orifice equipped with a valve.

The valve is tightly connected to the through-orifice, for example via a metal crimp.

Each sealed chamber B is hence individual. And it is intended to recover its shape when the animal leaves.

Manufacturing of the Elastic Layer

The elastic layer 1 according to the invention can be manufactured by assembling a set of superposed sub-layers, to form a one-piece set.

The assembly technology can be chosen for example among—vulcanization, —bonding, —welding.

Figure 4:
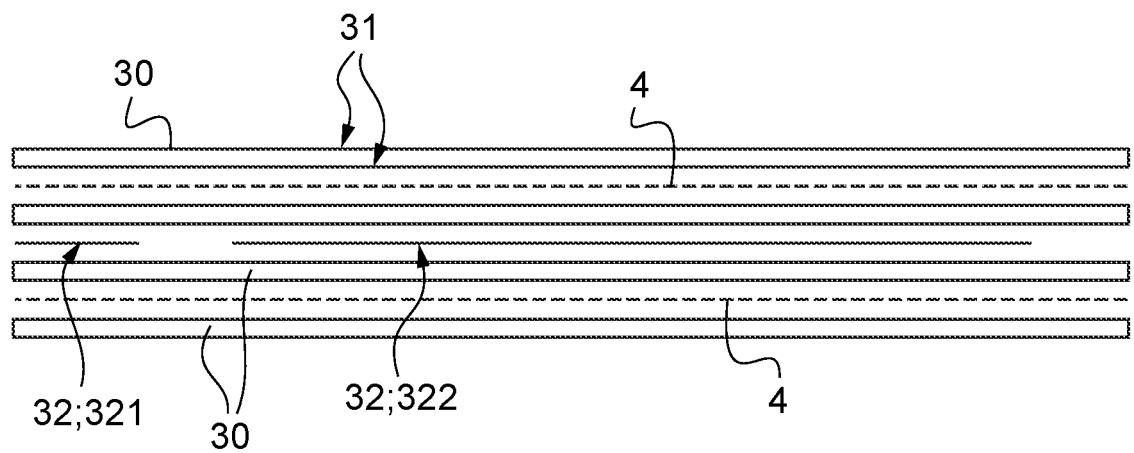
FIG. 4 is a schematic side view of the different parts intended to be assembled to form the elastic layer according to FIG. 3.

As illustrated in FIG. 4, the method for manufacturing the elastic layer 1 comprises:
- (i) a step of superposing sub-layers of elastomeric material 30 having two opposite surfaces 31, between which are placed:
  - interlayer means 32 adapted to locally prevent the securing of the opposite surfaces 31 of said layers 30 to each other, to form the lips 6, 7 and, as the case may be, the sealed chambers B, and
  - potentially, reinforcement layers 4, then
- (ii) a step of securing the surfaces in contact 31 of said sub-layers of elastomeric material 30 (i.e. out of the space occupied by the interlayer means 32), in such a way that the interlayer means 32 form the lips 6, 7 and, as the case may be, the sealed chambers B.

The interlayer means 32 consist of any means avoiding the securing between the opposite surfaces 31 of the layers 30 to be assembled.

In the case of a vulcanization, the interlayer means 32 consist for example of strips or tubes that are advantageously made of a material chosen among:
- a fire-barrier film containing a retardant, for example made of polypropylene, acrylonitrile-butadiene-styrene,
- a layer of silicone,
- a layer of a vulcanized elastomeric material, for example a pipe made of styrene-butadiene rubber (SBR), natural rubber (NR) or ethylene-propylene-diene monomer.

These interlayer means 32 are in particular arranged between two sub-layers of elastomeric material 30 to be assembled to each other.

Generally, these interlayer means 32 are distributed on a custom basis, as a function of the desired arrangement of the lips 6, 7 and, as the case may be, of the sealed chambers B.

Herein, as illustrated in FIG. 4, the superposition step advantageously comprises superposing four sub-layers of elastomeric material 30 with a sub-layer of interlayer means 32 placed between two of said sub-layers of elastomeric material 30.

The sub-layer of interlayer means 32 includes a strip 321 that is arranged laterally to form the lips 6, 7.

Generally, the four sub-layers of elastomeric material 30 advantageously have identical widths.

It is then possible to obtain the lips 6, 7 having identical widths without additional step (FIG. 3).

As an alternative, it is also possible to perform an additional step of cutting one at least of the lips 6, 7, advantageously the lower lip 7, to reduce at least one part of the width of said at least one lip 7.

As a function of the cutting width, it is hence possible to obtain a fastening strip 5 including:
- lips 6, 7 having different widths (FIGS. 5 to 7), when the lower lip 7 is partially cut, or
- a single lip 6, advantageously an upper lip 6 whose upper face 62 advantageously extends in the continuation of the upper face 15 of said elastic layer 1, when the lower lip 7 is cut at its base (FIG. 5).

Still generally, the sub-layer of interlayer means 32 can also include several rectangles 322 that are distributed over the length of the sub-layers of elastomeric material 30, to form the sealed chambers B.

Method for Installing a Mattress Structure

The present invention relates to the method for installing the mattress structure 2.

This installation method comprises a step of securing the fastening strip 5 to the ground L4 of the accommodation area L by positioning of securing means F at one at least of the lips 6, 7 (FIG. 3 or 7).

In particular, the securing means F are advantageously placed in such a way as to cross one of the lips 6, 7. These securing means F are then protected and covered by one of the lips 6, 7.

This securing step can take different forms, in particular as a function the width of the lips 6, 7.

In the case of lips 6, 7 having identical widths (FIG. 3), the securing means F are advantageously placed on the lower lip 7.

This positioning may be facilitated by spacing the upper lip 6 apart from the lower lip 7.

The upper lip 6 can then be pulled down onto the lower lip 7, in such a way as to cover the securing means F that can also extend within the slot I.

In the case of a width R6 of the upper lip 6 that is greater than the width R7 of the lower lip 7 or also, in the case of a fastening strip 5 formed by a single upper lip 6, the securing means F are advantageously placed within the upper lip 6, directed towards the ground.

Figure 6:
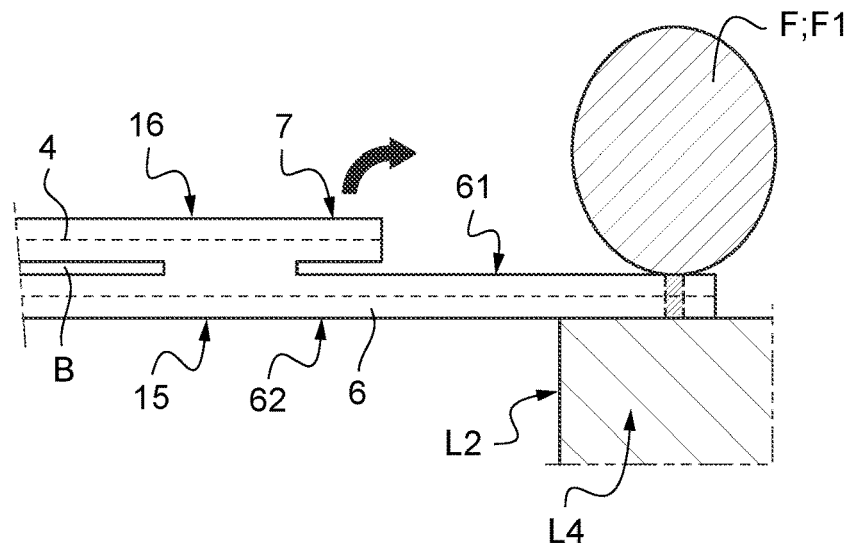
FIG. 6 shows a first step of the method for installing a mattress structure according to FIG. 5.

For that purpose, the elastic layer 1 is advantageously arranged along or out of the accommodation area L, in such a way that its upper face 15 is directed towards the ground and above the corridor (FIG. 6).

Likewise, the upper face 62 of the upper lip 6 is directed towards the ground, at the fastening strip thereof in the accommodation area L.

The upper lip 6, adjacent to the ground and bordering the accommodation area L, is then secured to the ground L4 of the accommodation area L.

This fastening is advantageously made in combination with a profile F1 that is placed against the lower face 61 of the upper lip 6 (directed upward) and whose cross-section is intended to define the bent applied to this upper lip 6.

The elastic layer 1 is then pivoted about its fastening strip 5, in such a way as to cover the accommodation area L.

In other words, the elastic layer 1 is arranged in such a way as to cover the accommodation area L, in such a way that its lower face 16 is directed towards the ground.

In practice, this accommodation area L can also be covered with an interlayer comfort sub-layer 28, thus intended to come between the elastic layer 1 and the ground L4 (FIG. 7).

This comfort sub-layer 28 advantageously consists of a part (or a block of material), generally parallelepipedal in shape, preferably made of an elastic material.

By "elastic material", it is advantageously meant a plate made of rubber granules (agglomerated or not) or of latex.

The density of said comfort sub-layer 28 is advantageously comprised between 150 and 800 kg/m³, preferably from 450 to 550 kg/m³.

The thickness dimension E28 of this comfort sub-layer 28 is advantageously of two to four times the thickness dimension E1 of the elastic layer 1.

During this operation, the fastened upper lip 6 undergoes a bending/folding action, to form a hem 66 (generally, U-shaped), advantageously in such as way as to envelop the profile F1.

The width difference between the lips 6, 7, or even the absence of lower lip 7, hence creates a kind of recess allowing the folding, over itself, of the upper lip 6.

The securing means F, in particular the profile F1, are then advantageously enveloped in the hem 66 formed at the lower face 61 of the upper lip 6.

In other words, the upper lip 6 is bent/folded towards the free edge 73 of the lower lip 7, to form a hem 66 and the securing means F are placed/protected within said hem 66.

In these different embodiments, the securing means F are then protected and covered by one of the lips 6, 7, in such a way as to prevent a direct contact with the animals.

The animals can then settle down on the comfort mattress 2, without risking injuring themself with the securing means F.

The invention claimed is:

1. An elastic layer for a mattress structure configured for comfort of animals in a livestock enclosure, said mattress structure being configured to cover the ground of an accommodation area bordered by a circulation corridor, said elastic layer comprising:
    two opposite faces including
        an upper face that is configured to undergo an elastic deformation and that includes at least one location configured for an animal to rest on, and
        a lower face,
        said upper and lower faces defining the thickness of said elastic layer,
    wherein said elastic layer is delimited by a plurality of borders including a rear longitudinal border configured to be located along the circulation corridor, a front longitudinal border configured to be located remote from the circulation corridor, and two lateral borders, at least the rear longitudinal border being formed by at least one one-piece fastening strip configured to receive a securing system configured to secure to the ground of said accommodation area, said at least one fastening strip being formed by at least one lip including
    a lower face,
    an upper face
    a free peripheral edge, and
    at least one reinforcement sub-layer,
    said upper and lower faces defining the thickness of said at least one lip,
    the thickness of said at least one lip being less than the thickness of said elastic layer,
    the at least one lip comprising one of: (i) a single lip, the upper face of the single lip extending in a continuation of the upper face of the elastic layer, and (ii) two superposed lips including an upper lip and a lower lip, the lower face of the upper lip and the upper face of the lower lip being opposite one another and independent from each other, the upper and lower lips delimiting a slot, extending in a part of the thickness of elastic layer, between the two opposite faces of the elastic layer.

2. The elastic layer according to claim 1, wherein, when the at least one fastening strip is formed by the two superposed lips, the two superposed lips have identical widths.

3. The elastic layer according to claim 1, wherein, when the at least one fastening strip is formed by the two superposed lips, the width of the upper lip is greater than the width of the lower lip.

4. The elastic layer according to claim 1, wherein said at least one lip has a width from 30 to 100 mm.

5. The elastic layer according to claim 1, wherein the layer comprises at least one elastic material chosen among (i) elastomeric materials and (ii) plastic or thermoplastic elastomeric (TPE) materials, and obtained by superposition and securing of sub-layers of elastomeric material.

6. A method for manufacturing the elastic layer according to claim 1, said manufacturing method comprising:
    superposing elastomeric material sublayers including two opposite surfaces, between which are placed an interlayer configured to locally prevent securing of said opposite surfaces of said sub-layers to each other, in order to form the at least two superposed lips, when the at least one fastening strip is formed by the two superposed lips, and, as at least one sealed chamber; and then securing the surfaces in contact of said superposed sub-layers, out of the space occupied by the interlayer, such that the interlayer forms said lips, and said at least one sealed chamber, then cutting one at least of said lips, to reduce at least a part of the width of said at least one lip.

7. A mattress structure adapted for the comfort of animals in a livestock enclosure, the mattress structure being configured to cover the ground of an accommodation area, said mattress structure including, or consisting of, at least one elastic layer according to claim 1.

8. A method for installing the mattress structure according to claim 7, the method comprising:

securing the at least one fastening strip to the ground of the accommodation area by positioning of a securing system at said at least one lip.

9. The method for installing the mattress structure according to claim 8, wherein, in the case of lips having identical widths, the securing system is placed on the lower lip and are covered by the upper lip.

10. The method for installing the mattress structure according to claim 8, wherein, when a width of the upper lip is greater than the width of the lower lip when the at least one lip comprises the two superposed lips or when the at least one lip comprises the single lip that is an upper lip, the securing system is placed within the upper lip or the single upper lip, directed towards the ground, then the upper lip of the elastic layer is bent or folded to form a hem.

11. A livestock enclosure within which is arranged at least one accommodation area for the animals, the ground being covered with the mattress structure according to claim 7, wherein said at least one lip of the elastic layer is secured to the ground using an added securing system.

12. The elastic layer of claim 1, wherein said at least one lip has a width from 50 to 60 mm.

13. The elastic layer of claim 1, wherein the layer comprises at least one elastic material comprising at least one of elastomeric materials, plastic materials, and thermoplastic elastomeric materials.

14. The elastic layer of claim 13, wherein the at least one elastic material is obtained by superposition and securing of sub-layers of elastomeric material.

* * * * *